March 10, 1970 D. A. CALDWELL 3,500,046
TESTER FOR FREE WATER IN HYDROCARBONS
Filed June 21, 1966 2 Sheets-Sheet 1

DONALD A. CALDWELL INVENTOR

BY Donald F. Wohlers

PATENT ATTORNEY

March 10, 1970      D. A. CALDWELL      3,500,046
TESTER FOR FREE WATER IN HYDROCARBONS
Filed June 21, 1966                     2 Sheets-Sheet 2

DONALD A. CALDWELL  INVENTOR

BY  *Donald F. Celolilere*

PATENT ATTORNEY

United States Patent Office 3,500,046
Patented Mar. 10, 1970

3,500,046
TESTER FOR FREE WATER IN HYDROCARBONS
Donald A. Caldwell, Mountainside, N.J., assignor to Esso Research and Engineering Company, a corporation of Delaware
Filed June 21, 1966, Ser. No. 559,139
Int. Cl. G01n *21/38, 21/16*
U.S. Cl. 250—71         1 Claim

ABSTRACT OF THE DISCLOSURE

A method and apparatus for determining the amount of water above the saturation value in a hydrocarbon liquid such as jet fuel includes passing a known quantity of liquid having an unknown quantity of undissolved water through a test element having a sensitive area which will fluoresce in the presence of ultraviolet light in proportion to the amount of undissolved water collected by the sensitive area. The test element and a standard element having a known fluorescent intensity are subjected to ultraviolet light, whereupon the intensity of the ultraviolet light striking the surface of one of the elements is varied to match its fluorescent intensity with the reflected fluorescent intensity of the other element. The intensity level of the varied fluorescent light is correlated to a known predetermined quantity of undissolved water in the liquid.

---

Figure 1:
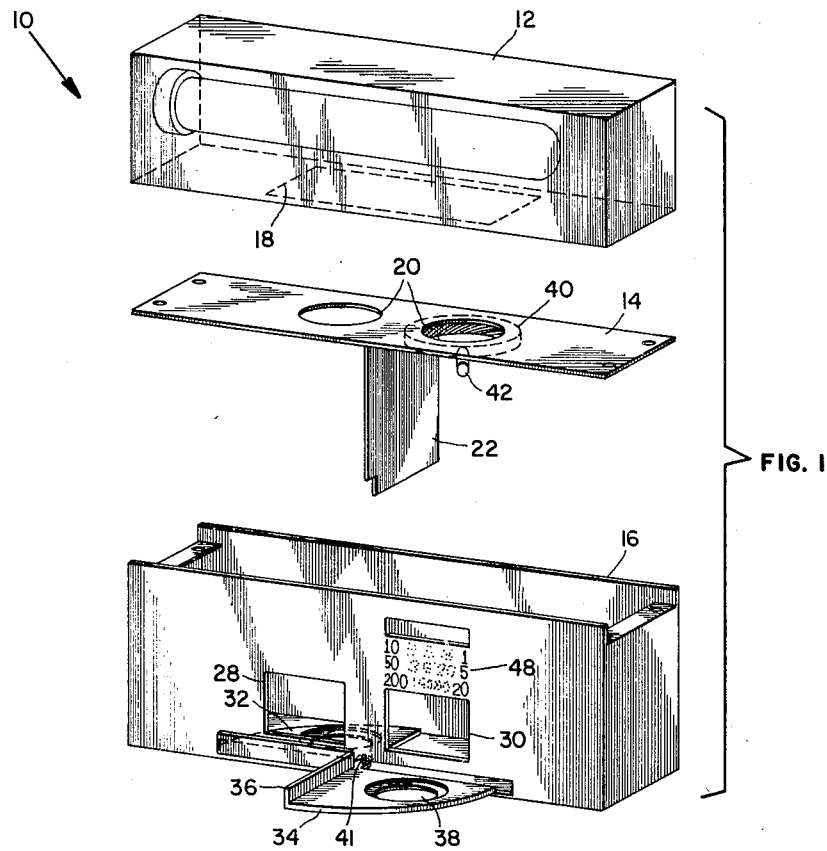

This invention relates in general to a method and apparatus for determining the amount of free water in a hydrocarbon liquid. In particular, the invention relates to an improved apparatus and a method of obtaining a fluorescent match between a standard sample and a test sample, wherein the fluorescent intensity of the standard sample is representative of a known predetermined amount of free water, and wherein the fluorescent intensity of the test sample is proportional to an unknown amount of free water present in the hydrocarbon liquid.

A well-known technique for determining the amount of free water or undissolved water in a hydrocarbon liquid in excess of the saturation value of water in the liquid is to pass a known predetermined amount of the hydrocarbon liquid through a filtering element having thereon a coating of potassium fluorescein. The potassium fluorescein coating will absorb the free water in the hydrocarbon and will, in the presence of ultraviolet light, have a fluorescent intensity in proportion to the amount of free water collected. This technique has been generally described in U.S. Patent No. 3,066,221. It has been the practice to compare a test specimen thus obtained in the presence of an ultraviolet light source with a plurality of standard fluorescent intensity samples each of which fluoresces at a diffrent intensity representative of a known predetermined amount of free water. Thus, when the test sample was placed side by side with the series of standards, its fluorescent intensity could be matched with one of the standards or, if not directly with any single standard, at least as being of an intensity between two of the standards thereby indicating that the free water of the hydrocarbon under test was of a quantity somewhere between the quantities of free water represented by the bracketing standard sample intensities. Obviously, under this know prior art technique it is relatively unlikely that any test sample will ever exactly match the fluorescent intensity of the range of standard samples with which it is being compared and at best it may only be said that the water content of the hydrocarbon under test lies somewhere between two known quantities. In other words, the prior art system merely yields a range of free water contents within which the unknown free water content lies.

In contrast to this prior art technique, the invention of the present application provides a new and novel means for exactly determining the amount of free water in a sample without the need of a plurality of fluorescent standard elements. In applicant's technique, a single test sample is taken in a manner substantially similar to the method described in the prior art patent referenced above. However, in accordance with applicant's invention, this test sample is compared in the presence of ultraviolet light with a single standard fluorescent element of known predetermined fluorescent intensity equivalent to a known predetermined amount of free water. However, in accordance with applicant's invention, the intensity of the ultraviolet light hitting one of the two elements, either the test sample or standard sample is varied while the ultraviolet light intensity illuminating the other sample is maintained constant. The ultraviolet intensity is either reduced or increased to a level so that equal fluorescent intensities are obtained between the two elements. At this point of fluorescent match, the measure of the varied ultraviolet light is indicative of the actual amount of free water in the test sample. While in the subsequent description the invention will be described in terms of reducing the ultraviolet light intensity hitting the standard sample to match its fluorescence with the fluorescent level of the test sample, those skilled in the art will readily appreciate that applicant's invention is equally suitable to the reverse procedure wherein the intensity of the light hitting the test sample is varied to match the intensity of the standard sample as will be more fully described hereafter.

Accordingly, it is a principal object of this invention to provide a new and novel method and apparatus for comparing the fluorescent intensity of a test sample with a standard sample.

Another object of the invention is to provide an improved free water detector which gives an exact quantitative indication of the amount of free water in a test sample.

Another object of the invention is to provide novel apparatus for varying the intensity of a portion of the ultraviolet light emitted from an ultraviolet light source.

A further object of the invention is to provide a free water detector which is simple in design, rugged in construction and economical to manufacture.

Figure 4:
Figure 5:
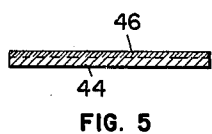
Figure 2:
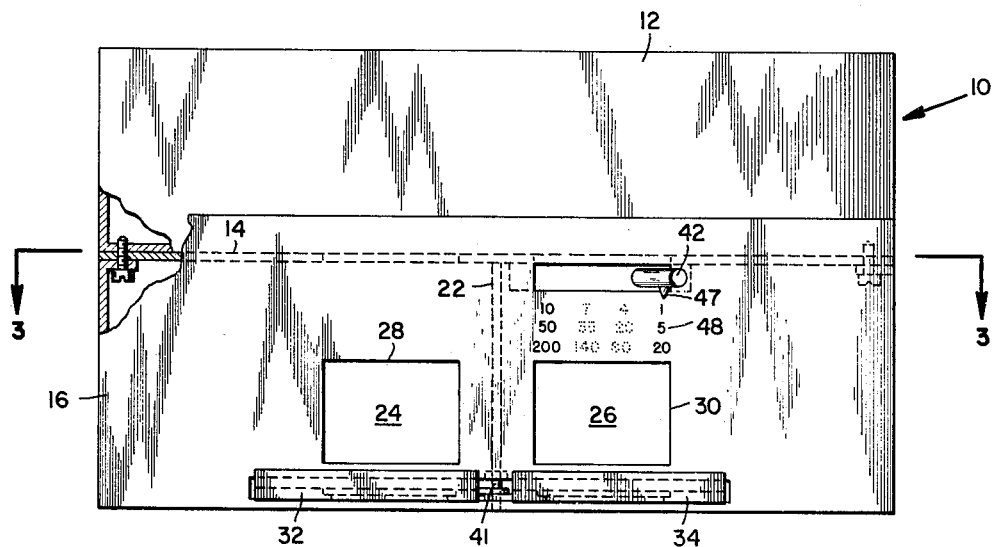
Figure 3:
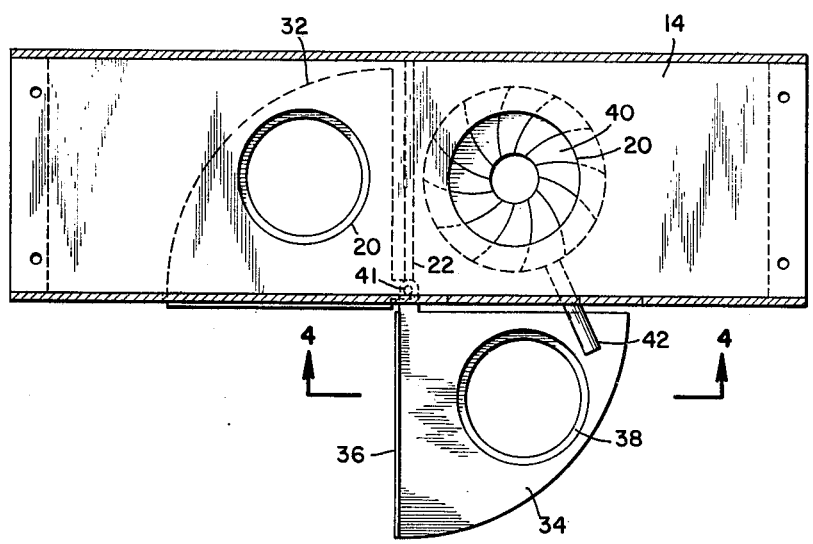

These and other objects and advantages of the invention will become apparent and the invention will be fully understood from the following description and drawings in which:

FIG. 1 is an exploded perspective view of the invention;
FIG. 2 is a front elevation view of the invention;
FIG. 3 is a horizontal cross-sectional view taken along line 3—3 of FIG. 2;
FIG. 4 is a cross-sectional view taken along line 4—4 of FIG. 3; and
FIG. 5 is a view of a typical test element.

In the subsequent specification, it should be understood that the use of the term free water is descriptive of the water above the saturation value in a hydrocarbon liquid. In other words, free water may be used synonymously with undissolved water.

Referring to the drawings in particular, a free water tester 10 in accordance with the invention includes an ultraviolet light source 12 which is preferably battery powered. The ultraviolet light source 12 is attached to an aperture plate 14 which is in turn fastened by conventional means to a view box 16. The lower surface of the ultraviolet source 12 includes a light emission window 18 which projects ultraviolet light of uniform intensity into and through two preferably equal diameter adjacent apertures 20 formed in the aperture plate 14. The light passing through the apertures 20 illuminates the left and right-hand chambers of the view box 16. The chambers are formed in the box 16 by a depending partition member 22 which divides the internal volume of the box 16 into a left-hand sample chamber designated 24 and a right-hand standard chamber designated 26. The chambers 24 and 26 each communicates with the exterior of the box 16 through viewing ports respectively 28 and 30. With the chambers, directly beneath these viewing ports 28 and 30 are a pair of pivotally mounted trays 32 and 34. The left-hand tray 32 is adapted to hold a sample element that has been pretreated by the hydrocarbon fluid under test. The right-hand tray 34 is substantially similar to the left-hand tray 32 and is adapted to normally receive a standard specimen having a known predetermined fluorescent intensity under a given magnitude of ultraviolet light representative of a known amount of undissolved water. Each of the trays 32 and 34 include a front flange portion 36 bent upwardly to effectively provide a mechanical stop in the inwardly pivoted position of the tray when in contact against the front face of the box 16. Each of the trays also includes a stepped aperture 38 which is adapted to engage the periphery of the circular test and sample elements to be described hereafter. Each of the trays is rotatable about a pivot shown generally at 41.

One of the apertures 20 includes therebelow an iris diaphragm 40 controllable secondary aperture which may be decreased in effective diameter by rotation of an adjusting arm 42 extending exteriorly of the box 16. When the adjusting arm is positioned to a maximum aperture setting the iris will preferably assume a diameter equal to aperture 20 and the light passing through each aperture 20 into each chambers 24 and 26 will be equal in intensity. Therefore, the light striking the test sample placed upon tray 32 in the left-hand chamber 24 will be substantially equal to the light hitting the standard sample on the tray 34 in the chamber 26. The samples are preferably made of a filter paper material 44 having a water sensitive impregnation or coating 46 thereon. The standard sample may be of this nature but also could be a type of fluorescent dye having a fluorescent intensity representative of a predetermined amount of free water. Still another and more stable standard sample element could be composed of a combination of fluorescent and nonfluorescent inorganic pigments. A standard sample of this nature would include a uniform background coating of nonfluorescent inorganic pigments having the same color in ordinary light as the color of the test sample. Over this background layer would be applied the desired amount of fluorescent inorganic phosphors representative of a predetermined free water content. Preferably the appearance of the fluorescent layer will blend with the appearance of the background coating under ordinary light, and will also present, under ultraviolet light, an appearance similar to that of the test specimen.

In operation, a known quantity of hydrocarbon liquid under test, usually jet fuel, is passed through the filter paper 44 (by means not shown). The coating 46 on the paper 44 has the ability to absorb free water from the fuel passed therethrough. The coating 46 may be of a potassium salt composition such as disclosed in Patent No. 3,066,221 or other types of salts such as sodium salt. In any event, the material has the property of fluorescing in proportion to the amount of free water collected by the salt during the passage of the hydrocarbon fluid through the filter element 44. The sample, thus prepared, is placed on the tray 32 in the left-hand chamber 24 and thus subjected to the illumination from the left-hand side of the ultraviolet light window 18. The standard element is placed on the right-hand tray 34 and subjected to the illumination passing through the iris diaphragm 40. If as is usually the case, the relative fluorescent intensities of the two elements thus illuminated differ, the adjusting arm 42 is positioned to a point where the light striking the standard element is decreased to hereby decrease its fluorescent intensity to a point where it matches the fluorescent intensity of the sample viewed by the operator of the instrument through window 28. At this point of fluorescent match, therefore, the measure of the decreased illumination resulting from an aperture decrease in diameter is then proportional to the amount of free water collected by the test sample and may be read from an index pointer 47 carried by the arm 42 opposite the scale 48. For convenience, arm 42 and scale 48 are shown on the front of the invention (FIG. 2), but would preferably be located away from the viewing ports either on the ends or rear of the view box 16.

In the operation above described, the normal fluorescent intensity of the standard sample on tray 34 in the presence of the undiminished ultraviolet light is selected to have a higher fluorescent intensity than the level of the sample in chamber 24. Thus a decrease in the light intensity hitting the standard sample from the maximum light intensity is normally required to match its fluorescence with that of the test specimen. As may be seen from FIG. 2, a plurality of indicia ranges 48 are shown wherein typically the maximum water concentration for the ranges is shown for 10 parts per million (p.p.m.), 50 p.p.m. and 200 p.p.m. In use, depending upon the range in water level in the hydrocarbon fluid under test, either a standard element of 10 p.p.m., 50 p.p.m. or 200 p.p.m. would be used to accommodate the actual range of free water collected on the test sample in chamber 24 or, preferably, the volume of fluid under test is adjusted to accommodate the actual range of free water so tested to a single standard element. As an example, a single standard element representing 50 p.p.m. of free water in a 100 ml. sample of test fluid is used. Then the same standard will represent 10 p.p.m. in a 500 ml. sample as well as 200 p.p.m in a 25 ml. sample.

While for purposes of explanation, applicant's invention has been described in a configuration in which the test specimen is under the fixed left-hand aperture 20 and the standard element is under the variable aperture defined by iris 40 and the standard element is selected to have a normal fluorescent intensity greater than the usual test element, it should be appreciated that the relative positions of the parts can be reversed without departing from the spirit of applicant's invention. With the arrangement already described, the free water concentrations that can be measured range from the level represented by the standard downward to a limit set by the smallest aperture to which the iris diaphragm 40 can be closed. The closest color match is possible at the highest calibrated water concentration since the diaphragm is wide open and the amount of ultraviolet light and extraneous blue light is nearly the same through both apertures. This configuration is preferred where the free water content being measured is to be maintained below some maximum value, as is the case in standard quality control testing of jet fuel.

However, applicant's invention is as previously mentioned equally usable in a reverse type manner wherein the test specimen is placed under the variable aperture 40. In this arrangement, the standard element represents the lowest amount of free water of interest and the measurable concentrations range from that amount upward to a limit set by the smallest possible aperture. In this case, the closest color match is at the lowest calibrated water concentration, since the iris diaphragm is wide open at that point. At higher water concentrations, the test specimen is brighter than the standard, under equal ultraviolet light, and the iris must be closed down to match fluorescent intensities. This configuration might be preferred in applications where the free water content needs to be maintained above some minimum value.

Those skilled in the art will readily appreciate that many mechanical variations in applicant's specific design may be made without departing from the scope of his invention. For instance, the standard sample need not necessarily be put on the movable tray 34 but could be permanently mounted beneath the iris 40 thereby eliminating one of the two pivoted trays. Furthermore, another variation could be the mere placement of equal sized holes in the bottom of the viewing box 16 directly beneath the light entrance apertures 20. Thus, regardless of the size of the test disk used, the area exposed for matching fluorescent intensities would always be the same for both the test specimen and the standard. The indicated free water is proportionately adjusted for the effective test disk area.

While a specific embodiment of the invention has been shown and described in detail to illustrate the application of the inventive principles, it will be understood that the invention may be embodied otherwise without departing from such principles.

What is claimed is:

1. Apparatus for determining the amount of water above the saturation value in a liquid, such as a hydrocarbon liquid, comprising a single source of ultraviolet light having a uniform intensity output level, means for holding a test element having a sensitive portion which will fluoresce in the presence of ultraviolet light in proportion to the amount of undissolved water collected by said portion adjacent said ultraviolet light, means for holding a standard element having a fluorescent intensity representative of a known predetermined amount of undissolved water adjacent said ultraviolet light, opaque partition means within said holding means for dividing said holding means into separate chambers for said test and standard elements, means for varying the intensity of the ultraviolet light striking the test element to match its reflected fluorescent intensity with the reflected fluorescent intensity of the other said element, and iris diaphragm means for correlating the intensity of the varied ultraviolet light at the point of matched reflected fluorescent intensity to a known predetermined quantity of undissolved water in said liquid.

References Cited

UNITED STATES PATENTS

| 2,217,991 | 10/1940 | Peck et al. | 250—78 |
| 2,593,391 | 4/1952 | Bray. | |
| 3,012,142 | 12/1961 | Etzel. | |
| 3,194,963 | 7/1965 | McKee. | |
| 1,912,740 | 6/1933 | Tuttle et al. | |
| 1,993,958 | 3/1935 | De Ybarrondo. | |
| 2,326,007 | 8/1943 | Gapstaff. | |
| 3,066,221 | 7/1961 | Thyrum | 250—71 |

ARCHIE R. BORCHELT, Primary Examiner

U.S. Cl. X.R.

250—83